Patented Nov. 2, 1948

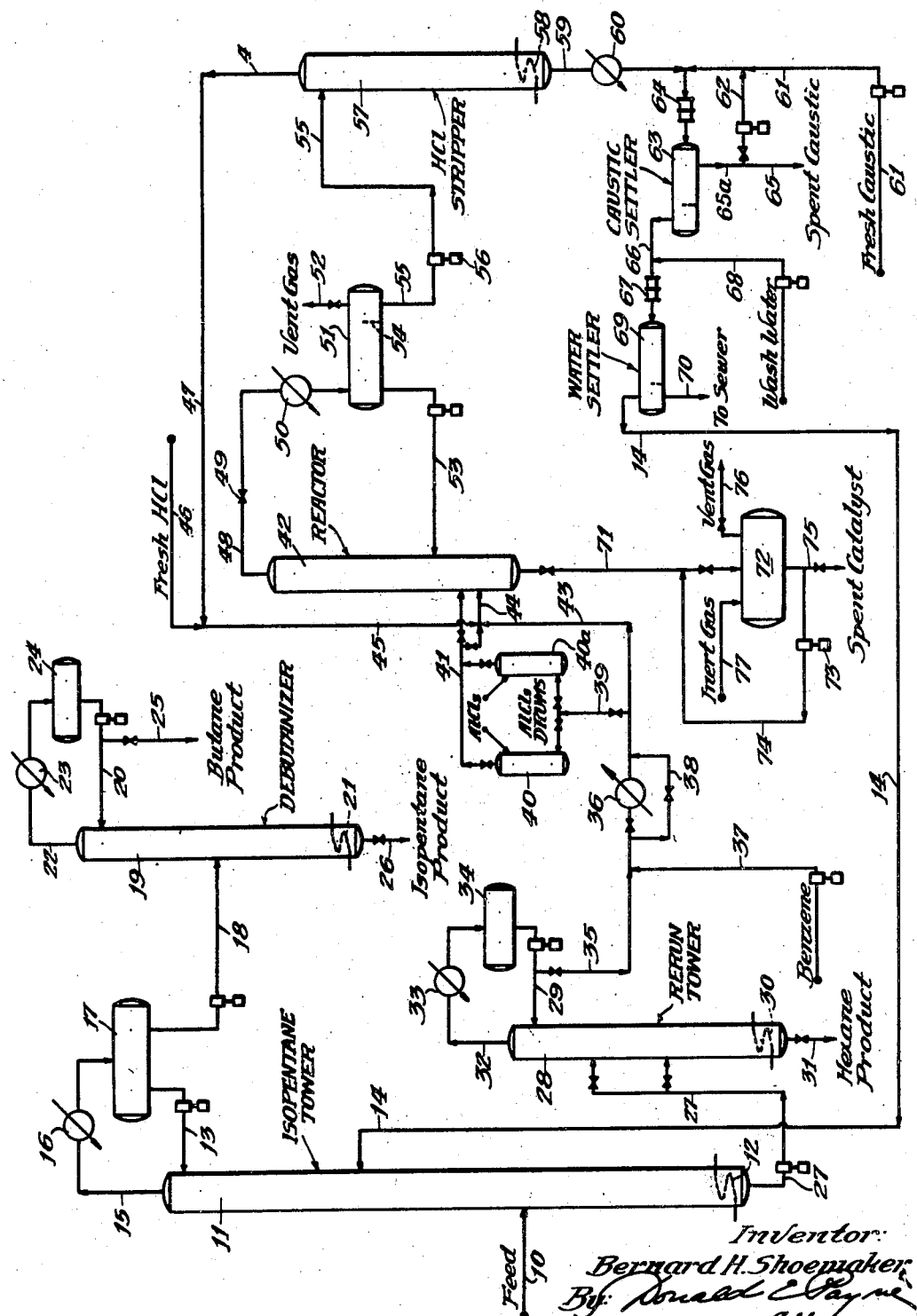

2,452,691

UNITED STATES PATENT OFFICE 2,452,691

ISOMERIZATION OF PARAFFINIC HYDROCARBONS

Bernard H. Shoemaker, Hammond, Ind., assignor to Standard Oil Company, Chicago, Ill., a corporation of Indiana Application March 31, 1943, Serial No. 481,313

19 Claims. (Cl. 260—683.5)

This invention relates to a pentane conversion system and it pertains more particularly to improved methods and means for treating normal pentane with aluminum halide catalysts in the absence of added hydrogen pressures. This application is a continuation-in-part of my prior application, Serial No. 446,939, filed June 13, 1942, now abandoned.

An object of my invention is to provide a simple, inexpensive and remarkably effective method and means for converting normal pentane into more valuable products. A further object is to obtain long catalyst life in a disproportionation reaction or a still longer catalyst life in an isomerization reaction in the absence of added hydrogen, using an aluminum halide paraffinic hydrocarbon complex catalyst with a hydrogen halide activator. A further object is to provide a new and improved pentane conversion system which may also be employed for converting butane or mixtures of butane and pentane with minimum consumption of catalyst and activator and maximum yields of valuable products.

It is known that hydrocarbons of the light naphtha boiling range from butanes to heptanes may be converted into more highly branched-chain products by means of aluminum halide catalysts promoted by a hydrogen halide. The active life of said catalysts may be prolonged by employing hydrogen pressures in the conversion zone in the case of normally liquid hydrocarbons or by separate hydrogen regeneration in the case of butane isomerization. Heretofore it has been believed by those skilled in the art that hydrogen pressures were essential for obtaining a feasible catalyst life in the case of pentanes as well as in the case of hexanes and heptanes. I have now discovered that pentane behaves in an unexpectedly different manner from its homologs and that in the case of pentanes the use of hydrogen may be entirely dispensed with. If it is desired to produce from normal pentane a composite product consisting essentially of isobutane, isopentane, and branched-chain hexanes and heptanes I may contact the normal pentane charging stock with a particular type of aluminum chloride catalyst in the substantial absence of aromatics and naphthenes and still obtain a reasonably long catalyst life; this phenomena is only true in the case of pentanes and to my knowledge does not hold for any other normally liquid hydrocarbon. On the other hand, if it is desired to convert normal pentane to isopentane without substantial cracking or formation of lighter or heavier products, then the contacting with the particular aluminum halide catalyst should be effected in the presence of small but critically important amounts of aromatics. The aromatics should be employed in amounts of about .02 to 3, preferably about .1 to 1% depending somewhat on the temperatures employed and other factors that will hereinafter be described. By treating the pentane fraction of the light naphtha apart from hexane and other homologs and in the absence of added hydrogen, I greatly reduce construction and operating costs and at the same time obtain remarkably high yields of valuable products and long catalyst life.

The remarkable and unexpected results obtainable by the use of pentane charging stocks in the absence of hydrogen pressures with particular aluminum halide catalysts are shown by numerous catalyst life studies made in connection with pentanes and with other hydrocarbons. The pentane employed in these catalyst life studies was a mixture of 62% normal and 38% isopentane obtained from natural gas and it was substantially free from aromatics and naphthenes. Its CFR-M (A. S. T. M.) octane number was 74.2. In the first catalyst life study a stirred batch reactor was employed into which was charged about 1.7 gallons of pentanes per pound of aluminum chloride together with about 2.8 weight percent of hydrogen chloride based on pentanes charged. The conversion was effected at about 212° F. and at a pressure of 200 to 250 pounds per square inch for a period of two hours after which the resulting complex was separated from product and additional pentane charge was added to the complex together with 2.8 weight percent of hydrogen chloride based on added charge and the reaction was then continued for another three hours. Thirteen separate tests were made with this same catalyst and after each test the weight percent of butanes in the product was determined and a CFR-M octane number of the debutanized liquid product was likewise determined. The results of these tests are as follows:

Table I

Isomerization of pentanes without H₂ and benzene:

| Run No. | Gals./lb. AlCl₃ | Contact Time, Hours | Weight Per Cent C₄ | CFR-M[1] |
|---|---|---|---|---|
| I-A | 1.7 | 2.0 | 55.0 | 81.1 |
| I-B | 3.0 | 3.0 | 51.7 | 78.3 |
| I-C | 4.3 | 3.0 | 38.2 | 74.6 |
| I-D | 5.6 | 3.0 | 32.8 | 72.8 |
| I-E | 6.9 | 3.0 | 26.2 | 72.5 |
| I-F | 8.2 | 3.0 | 22.3 | 72.8 |
| I-G | 9.5 | 3.0 | 17.4 | 72.2 |
| I-H | 10.8 | 1.0 | 5.5 | 75.1 |
| I-I | 12.1 | 3.0 | 8.2 | 74.1 |
| I-K | 13.4 | 3.0 | 7.9 | 74.3 |
| I-L | 14.7 | 3.0 | 7.0 | 75.1 |
| I-M | 16.0 | 3.0 | 4.9 | 74.3 |
| I-N | 17.3 | 3.0 | 4.7 | 75.0 |

[1] Debutanized product.

From the above table it will be noted that during the initial portion of the catalyst life the predominant reaction was cracking since butane production was more than 50% of the total reaction products. It will also be observed that the octane number of the normally liquid product after the first hour or two of operation was not appreciably better and in some cases was even worse than the octane number of the charging stock (which was 74.2 CFR-M).

A composite was made of the total product from the first five runs and when this composite was fractionated it showed the following product distribution:

|  | Per cent vol. |
|---|---|
| Butanes | 34.0 |
| Isopentane | 15.5 |
| n-Pentane | 21.6 |
| Neohexane | 3.9 |
| Diisopropyl | 1.4 |
| 2-methylpentane | 7.8 |
| 3-methylpentane | 3.2 |
| n-Hexane | 2.1 |
| C₆+ | 10.5 |

It will be observed that about one-third of the product constituted isobutane, another one-third pentanes and another one-third hexanes and heavier. The lowered octane number of the normally liquid products as shown by the above tabulation is apparently due to the methyl pentanes, normal hexanes and heavier products. The treatment of the pentane charge in the above manner was not particularly effective insofar as product improvement by true isomerization is concerned but it does provide a means for converting pentanes into isobutanes and hexanes respectively. Isobutanes are needed in alkylation processes for reaction with olefins to produce aviation gasolines. Hexanes are valuable charging stocks for isomerization under hydrogen pressure to produce "isomate" or neohexane which is an extremely valuable aviation blending stock. The above reaction may be referred to as a "disproportionation" of pentane for producing isobutane and hexanes (together with some heavier hydrocarbons).

It has long been known that isobutane could be produced from heavier hydrocarbons (U. S. Patent No. 2,172,146) but pentane is the only normally liquid hydrocarbon that can thus be disproportionated with a relatively long catalyst life. With pentane the catalyst life may be of the order of 10 gallons of disproportion products per pound of aluminum chloride while with hexanes, heptanes or higher hydrocarbons the catalyst life will be only about 1 gallon per pound or less. This pentane disproportionation step may be employed in conjunction with a hexane isomerization system for obtaining maximum catalyst utilization in the production of isobutane (for alkylation) and hexanes for the production of neohexane, both isobutane and neohexane being extremely valuable for the manufacture of aviation gasoline.

A similar catalyst life study was made in exactly the same manner as that hereinabove described with the added feature of including 0.5% of benzene in the pentane charging stock. The results of this second catalyst life test were as follows:

Table II

Isomerization of pentanes +0.5% benzene in the charge and without H₂.

| Run No. | Gals./lb. AlCl₃ | Contact Time, Hours | Weight percent C₄ | CFR-M[1] |
|---|---|---|---|---|
| II-A | 1.7 | 2.0 | 3.7 | 83.3 |
| II-B | 3.0 | 3.0 | 4.7 | 85.0 |
| II-C | 4.3 | 3.0 | 5.2 | 85.4 |
| II-D | 5.6 | 3.0 | 3.5 | 85.4 |
| II-E | 6.9 | 3.0 | 4.2 | 83.6 |
| II-F | 8.2 | 3.0 | 5.8 | 86.4 |
| II-G | 9.5 | 3.0 | 6.8 | 86.4 |
| II-H | 10.8 | 3.0 | 3.4 | 85.3 |
| II-J | 12.1 | 3.0 | 3.2 | 85.1 |
| II-K | 13.4 | 3.0 | 2.4 | 84.5 |
| II-L | 14.7 | 3.0 | 1.6 | 82.7 |
| II-M | 16.0 | 3.0 | 0.9 | 83.3 |
| II-N | 17.3 | 3.0 | 4.0 | 82.4 |
| II-O[2] | 18.6 | 3.0 | 3.5 | 81.8 |
| II-P[2] | 19.9 | 3.0 | 50.0 | 77.7 |
| II-Q | 21.2 | 3.0 | 10.3 | 80.7 |

[1] Debutanized product.
[2] No benzene.

The remarkable and unexpected effect of this critically small amount of benzene in inhibiting cracking and preventing side reactions is shown by the reduction of butane formation during the first period from 55% down to 3.7%. Thus it can be calculated that one molecule of benzene inhibits the formation of at least 100 molecules of butane. Another striking and unexpected result was the continued high product octane number even up to 17 gallons of charge per pound of aluminum chloride. It will be noted that in runs II-O and II-P the benzene was omitted from the charge with the consequence that butane production quickly jumped from 3.5 to 50% and product octane number dropped to 77.7 CFR-M. When benzene was once more included in the charge in run II-Q the butane production dropped sharply to 10.3 and the product octane number increased back to 80.7.

The debutanized product obtained in the absence of hydrogen and with 0.5% benzene in the pentane charge consisted of approximately 75% isopentane, 20% normal pentane and 5% hexanes and heavier. Note the sharp contrast between these product distributions and the debutanized product distribution obtained in the absence of added benzene where the isopentane was only about 23%, the normal pentane about 33% and the hexane and heavier about 44%. The presence of the added benzene thus directs the reaction directly toward isomerization and substantially eliminates the side reactions of cracking, disproportionation, etc.—it results in a marked octane number improvement in the debutanized product which improvement is not effected to any appreciable extent in the absence of the added benzene or equivalent material.

An outstanding feature of the operation in the presence of .5% benzene was the prolonged catalyst activity in the absence of added hydrogen. In the above runs (Table II) the catalyst activity at first gradually increased and thereafter the activity slowly diminished although the catalyst was still quite active at the end of the test. When hexanes, heptanes, etc., are employed instead of pentanes in the absence of hydrogen, the small amount of added benzene inhibits cracking to a substantial degree but the catalyst rapidly loses activity so that the elimination of hydrogen is practically limited, insofar as normally liquid hydrocarbon is concerned, to pentane isomerization.

It has been suggested that the reason for the excessive amount of cracking in the absence of benzene might be due to the long time of contact and a test was therefore made on the pentane charge in the absence of benzene with only 5 minute contact times, the reaction conditions otherwise remaining the same. In the first period of this test the isobutane production was 42.5%, in the second period 31.9% and the third period 25.9%. The debutanized product from the third period reaction had an octane number of only 72.8. Lowering the temperature to 150° F. caused a drastic lowering in debutanized product octane number and still resulted in high butane production. The above tests clearly show that when pentanes are treated with aluminum chloride catalyst in the absence of hydrogen and in the absence of cracking inhibitors, the cracking and disproportionation reactions are many fold more rapid than the isomerization reaction and these tests show that 0.5% of benzene in the pentane charge is a remarkably effective cracking inhibitor at a conversion temperature of about 200° F.

Since added benzene proved to be so effective a cracking inhibitor an effort was made to inhibit the cracking by adding the aromatics to the complex instead of to the charging stock. When 1% of aromatics based on feed was chemically combined with the complex however, the butane production was 58.1%. This proves beyond question that the added inhibitor must be present in the hydrocarbons undergoing conversion or merely dissolved in the complex and not a chemical component of the complex. The preferred catalyst is a complex resulting from the action of aluminum chloride and hydrogen chloride on the pentane charging stock itself. Paraffinic or paraffinic and naphthenic hydrocarbons in general may also be used, but on relatively large scale tests it has been found that a catalyst which has previously been successfully used for isomerizing a hexane cut of light naphtha in the presence of hydrogen does not always respond to the inhibiting action of benzene when such catalyst is subsequently employed for pentane isomerization. The larger scale tests have proved, however, the effectiveness of the critical small amounts of benzene in a pentane charging stock when the catalyst results from the reaction of aluminum chloride and hydrogen chloride with a portion of said charging stock.

In the above tests 0.5% of benzene based on pentane charge was employed but in other tests we have found that the amount of benzene may vary within the approximate range of 0.02 to 3%, the optimum range for most purposes being approximately 0.1% to 1%. Butane formation is inhibited to a greater extent by the use of as much as 2% or 3% of benzene at about 200° F. but these larger amounts of aromatics have an unfavorable effect on catalyst life and result in lowered product octane numbers. I prefer, therefore, to employ the smallest amount of aromatics that is reasonably possible for inhibiting butane formation in order that I may obtain maximum isomerization and octane number improvement from a given catalyst. About 16 gallons of charge may be processed per pound of aluminum chloride with .5% benzene (based on charge) at about 200° F. without lowering catalyst activity beyond the point reached when only about 10 gallons per pound of aluminum chloride with 2% benzene (based on charge) is employed at the same conversion temperature.

Tests in a continuous tower reactor have demonstrated the commercial feasibility of my improved pentane conversion processes. Employing a tower reactor about two-thirds to three-fourths filled with aluminum chloride complex and by passing liquid pentane charge containing the stated amounts of aromatics or naphthenes upwardly through the column of complex in the tower at a weight space velocity of the order of 0.4 to 4 volumes of charge per hour per volume of complex in the column, I have shown that at about 200° F. (e. g., 214° F.) butane production can be held in the vicinity of about 1% with amounts of benzene ranging from 1% to .1% in the pentane feed. However, if the column contains appreciable amounts of free aluminum chloride (as distinguished from aluminum chloride combined in the complex) at least about .25 to 1% of aromatics should be used in the charge. It is preferable in this case to start the reaction with about 1% or more of aromatics in the charge and then to reduce the amount of aromatics in the charge when equilibrium has been reached.

It should be pointed out that the optimum amount of aromatics for inhibiting side reactions is somewhat dependent on conversion temperatures. At about 200° F. the optimum is in the general vicinity of about 0.5% while at about 300° F. the optimum is in the general vicinity of about 2%. At higher temperatures, and particularly in the starting-up stage of the process the aromatic content may be of the order of about 3%. After equilibrium has been reached, lesser amounts of aromatics are required; at about 300° F. aromatics may be reduced to about 1% or lower and at about 200° F. aromatics may be reduced to the order of about 0.02% although about .25 to .5% is recommended as a safety factor. Thus it may be stated that the optimum range is 0.02% to 3% of aromatics based on feed and in view of the above explanation it should be unnecessary to correlate the aromatic content of the feed with conversion temperature or operating procedure in any further detail.

While benzene is a preferred example of the aromatic employed with the pentane feed stock in the practice of my invention it should be understood that other aromatics may be employed such as toluene, xylenes, alkyl benzenes, naphthalenes and substituted aromatics generally. Naphthenes may serve somewhat the same function as aromatics provided that they are employed in considerably larger amounts the optimum range in this case being of the order of about 1 to 15% by volume based on charging stock. When both aromatics and naphthenes are employed the amount of each should be correspondingly reduced because of the effect exhibited by the other, a given amount of aromatics being about ten times as effective as a corresponding amount of naphthenes. A mixture may be better than either inhibitor alone, particularly from the standpoint of catalyst life.

The invention will be more clearly understood from the following detailed description of a specific example thereof read in conjunction with the accompanying drawing which forms a part of this specification and which is a flow diagram of a commercial 1500 barrel per day pentane isomerization plant.

A typical refinery pentane stream which is preferably sweetened, debutanized and dehexanized is introduced by line 10 to isopentane tower 11 at the rate of about 1500 barrels per day. In this specific example the composition of the feed on a volume basis is about 2% normal butane, 40% isopentane, 55% normal pentane and 3% hexanes and heavier. Tower 11 may be about 7½ feet in diameter by about 110 feet tall, it may be provided with about 50 plates or trays and may be operated at a pressure of about 25 pounds gauge with a top temperature of about 140° F. and a bottom temperature of about 160° F. A suitable reboiler 12 maintains this bottom temperature. The top temperature is maintained by reflux introduced through line 13. A product stream of approximately 1200 barrels per day is introduced into this tower through line 14 at a higher point, for example at the 17th tray when the charging stock is introduced at the 33rd tray. About 11,200 barrels per day of overhead is withdrawn from the top of this tower through line 15 and condenser 16 to receiver 17 from which about 1430 barrels per day are withdrawn through line 18 to debutanizer tower 19, the balance being recycled through line 13 to serve as reflux in the top of tower 11.

Debutanizer tower 19 may be about 3½ feet in diameter by 61 feet tall, it may be operated at about 100 pounds gauge pressure with a top temperature of about 143° F. maintained by reflux introduced through line 20 and a bottom temperature of 224° F. maintained by reboiler 21. About 1875 barrels per day of butane, chiefly isobutane, is taken overhead through line 22 through condenser 23 to receiver 24. Approximately 110 to 115 barrels per day of butanes, chiefly isobutane, is withdrawn from the system through line 25 and the balance returned through line 20 to serve as reflux in tower 19.

The isopentane product stream is withdrawn from the base of tower 19 through line 26 at the rate of about 1315 to 1320 barrels per day. On a volume basis the composition of this isopentane is about 0.5% butane, 95% isopentane and 4.5% normal pentane.

The normal pentane and heavier components are withdrawn from the base of tower 11 through line 27 and introduced to rerun tower 28 which may be about 3½' feet in diameter by about 46 feet tall and which operates at about 25 pounds gauge pressure with a top temperature of 159° F. maintained by introduction of reflux through line 29 and a bottom temperature of 205° F. maintained by reboiler 30. The hexanes and heavier hydrocarbons are withdrawn from the base of tower 28 through line 31, this stream amounting to approximately 85 barrels per day.

Normal pentane is taken overhead from tower 28 through line 32 and condenser 33 to receiver 34, about 865 barrels per day being returned through line 29 for reflux in tower 28 and about 1175 barrels per day being passed through line 35 and heater 36 for introduction into the isomerization system. Before this charging stock enters the isomerization system benzene is introduced thereto through line 37 at the rate of about 6 barrels per day in order that the charging stock may contain about 0.5% of aromatics. A portion of the charge may by-pass heater 36 through line 38 in order to obtain the desired operating temperature in the isomerization reactor. About 95 barrels per day of the heated charge is passed through line 39 and one of the aluminum chloride drums 40 or 40a for dissolving sufficient aluminum chloride to maintain catalyst activity at the desired level. Approximately 850 pounds or less per day of aluminum chloride may thus be required for make-up. The solution of make-up aluminum chloride may be introduced by line 41 to reactor 42 either continuously or intermittently.

The remaining 1080 barrels per day of charging stock is introduced by lines 43 and 44 to reactor 42 along with hydrogen chloride from line 45. About 500 pounds per day of hydrogen chloride may be supplied to the system from an external source through line 46 and the remainder recycled through line 47 so that the charging stock entering reactor 42 will contain approximately 6% by weight of hydrogen chloride. To minimize corrosion difficulties the charging stock-hydrogen chloride stream may be introduced through line 44 separate from the aluminum chloride solution introduced through 41. Otherwise this added precaution may not be necessary.

Reactor 42 may be a vertical cylindrical vessel about 4½' feet in diameter by about 32 feet in height and in this case it is operated at a pressure of about 300 pounds gauge and a temperature of about 215° F. The tower is about one-half to three-fourths filled with an aluminum chloride-hydrocarbon complex which is preferably made by the reaction of a portion of the charging stock with aluminum chloride in the presence of hydrogen chloride. This complex may either be formed in situ or introduced from an external source. It may be made from other hydrocarbons in the charging stock but in such case it is preferred that the hydrocarbons be substantially free from olefins and aromatics, a paraffinic hydrocarbon complex being highly preferred. The space velocity in the reactor will thus be seen to be approximately one volume of charging stock per hour per volume of catalyst complex in the reactor and the pressure is sufficient to maintain liquid phase conditions therein. In the lower or main part of the reactor the column of liquid complex is apparently in a continuous phase and the charging stock passes upwardly therethrough in intimate contact therewith. In the upper part of the reactor the hydrocarbon is the continuous phase and complex settles from the upflowing hydrocarbon product back to the mass of complex liquid in the reactor. Alternately, of course, the settling may be effected entirely in a separate zone. The product stream leaves the reactor through line 48, pressure reducing valve 49 and cooler 50 to accumulator drum 51 which operates at about 185 pounds gauge and about atmospheric to 100° F. temperature. Under these conditions most of the hydrogen chloride is dissolved in the liquid product and any gases may be vented through line 52 without losing appreciable amounts of hydrogen chloride. With a total charge of feed stock, benzene and hydrogen chloride of almost 14,000 pounds per hour, less than 10 pounds per hour of gases will have to be vented through line 52 and the hydrogen chloride vented from the system at this point will thus be not more than about 25 pounds per day in this 1500 barrel per day isomerization plant.

Any catalyst complex which separates out in settling drum 51 is returned by line 53 to reactor 42. The product stream which flows over weir 54 is withdrawn through line 55 and introduced by pump 56 to hydrogen chloride stripper 57 which may be a corrosion resistant tower about 2 feet 8 inches in diameter by 35 feet in height operating at a gage pressure of about 305 pounds per square inch, with a top temperature of about 130° F. and a bottom temperature of about 318° F. maintained by reboiler 58. The overhead from stripper 57 is returned by lines 47 and 46 for direct introduction into the reactor through line 44 along with charging stock from line 43.

The stripped product is withdrawn from the base of stripper 57 through line 59 and cooler 60 to mixer 64 wherein it is intimately mixed with fresh 20% caustic introduced at the rate of about 5 barrels per day from line 61 and recycled caustic from line 62 at the rate of about 300 barrels per day. The mixture of product and caustic is allowed to settle in caustic settler 63, the settled caustic being withdrawn through line 65a from which about 5 barrels per day is removed through line 65 as spent caustic.

The caustic treated product is then passed through line 66 to mixer 67 wherein it is mixed with water introduced at the rate of about 300 barrels per day from line 68. The wash water is settled from the product in settler 69 and the settled water withdrawn through line 70. The water washed product then passes through line 14 to isopentane tower 11 as hereinabove described.

Spent complex leaves reactor 42 through line 71 to storage drum 72. Likewise active catalyst may be withdrawn from the reactor to the storage drum when occasion demands and such active catalyst may then be returned to the storage drum by means of pump 73 and line 74. Spent catalyst may be withdrawn from the system through line 75. If desired the catalyst may be recycled after regenerating it by treatment with hydrogen, preferably in the presence of hydrogen chloride at a temperature within the range of 200-450° F. and a pressure of 500-1500 pounds per square inch. When spent complex is withdrawn to drum 72 it passes through pressure reducing valve in line 71 and a vent line 76 is provided to permit the escape of hydrogen chloride and hydrocarbon gases released on reduction of pressure on the complex. To prevent corrosion and coking in drum 72 the spent catalyst is protected from moisture and air by gas blanketing the drum with either dried, inert or hydrocarbon gas introduced through line 77.

From the specific example hereinabove set forth it will be seen that a remarkably effective pentane isomerization unit can be built and operated at a relatively low pressure in the absence of added hydrogen and with relatively low construction and operating costs. A remarkable feature of this process is the extremely low production of lighter and heavier hydrocarbons from the pentane charging stock, the relatively long catalyst life and high activity, and the simplicity of the system as a whole. The unexpectedly remarkable and important results obtained are due in large measure to the presence of the critically defined small amount of aromatics and the substantial elimination of hexanes and heavier hydrocarbons from the charging stock. The amount of hexanes in the charge which actually enters reactor 42 should be as low as commercially feasible and generally speaking should not exceed about 10%. Advantageous results may be obtained with as much as 20% of hexanes in the charge entering reactor 42 but I prefer to keep the hexane content of such charge down to at least about 5% or lower.

The above example is illustrative only and is by no means limitative. The conversion temperature is preferably within the range of 100 to 350° F. but higher or lower temperatures may be used. The pressure is preferably sufficient to maintain liquid phase conversion conditions. The space velocity is preferably within the range of about .3 to 3 volumes of charging stock per hour per volume of complex in the reactor but will depend on catalyst activity and with specific catalysts may be higher or lower than this preferred range. The amount of aromatics is within in the range of about .02 to 3% by volume, depending somewhat upon the temperature of the operation, about .1 to 1% being desirable for operations at temperatures of the order of about 200 to 250° F. I may employ more than one reactor and for example may employ a first reactor at 250° F. with a partially spent catalyst followed by another reactor at approximately 200° F. with a more active catalyst. In each tower the column of catalyst should be at least about 5 feet high, the usual height being within the range of 10 to 50 feet—this being important for obtaining the necessary extent of contact. The pressure in the settler may range from about 100 to 200 pounds per square inch, or more, the higher pressures being desirable if large amounts of butane are present.

My invention makes it possible for the first time to isomerize butanes and pentanes simultaneously in the same system. Heretofore simultaneous isomerization of these two hydrocarbons was not commercially feasible because the presence of as little as 0.5% pentane caused poor catalyst life in the absence of hydrogen pressures and the use of hydrogen pressures for improving catalyst life resulted in suppressing the isomerization of butane to a pronounced degree. By adding about 0.1 to 3% of aromatics to a butane-pentane mixture it is possible to obtain remarkably long catalyst life and to effect remarkably high conversions per pass of both the butane and the pentane components. The fractionation system must of course be amplified to effect separation of isobutane from normal butane and the charging stock in this case will be a mixture of the normal butane fraction with the normal pentane fraction. Temperatures and space velocities for simultaneously isomerizing butane and pentane may be approximately the same as for isomerizing pentane alone. The pressures for isomerizing the mixture will be somewhat higher in the conversion zone for maintaining liquid phase conditions, i. e., may be of the order of about 400 to 800 or, for example, about 600 pounds per square inch. Likewise the pressure in the separator may be somewhat higher, e. g., about 200 to 250 pounds per square inch in order to vent any light gases which might be formed in the reaction without losing appreciable amounts of butanes or hydrogen chloride. Generally speaking, however, a combined pentane-butane stream may be handled in much the same manner as the pentane stream itself and the normal butane may be substantially quantitatively converted into isobutane (about 60% conversion per pass) at the same time that the normal pentane is being converted to isopentane.

With aluminum halide paraffinic hydrocarbon complex catalyst life and catalyst activity are maintained to a remarkable extent by the inclusion of the critically small amount of aromatics with the pentane charge and as already pointed out, the aromatics must be in the charging stock rather than combined in the complex itself. The so-called Gustavson complex or other complexes prepared from aromatic hydrocarbons are not suitable for use in this process and the amount of aromatics added to the feed should be as low as commercially feasible to avoid formation of complex by reaction of added aromatics with make-up aluminum chloride. While my invention is primarily directed to the use of the aluminum halide paraffinic hydrocarbon complex it should be understood, however, that other Friedel-Crafts catalysts may be used as well as anhydrous hydrogen fluoride, aqueous hydrogen fluoride-boron fluoride compositions, other active metal halide hydrocarbon complexes, double salts of aluminum halides or other active metal halides, etc. Catalyst promoters or modifiers such as halides of sulfur, selenium or tellurium, halides of nickel or cobalt, or metallic additives such as aluminum and metallic nickel, etc., may be employed along with the Friedel-Crafts catalysts per se but such additives or promoters are usually unnecessary.

It will be understood from the above description that my pentane conversion system may be employed in conjunction with other conversion systems. The small amount of hexanes formed in the pentane isomerization process (or the large amount of hexanes formed by a pentane disproportionation process) may be charged to a hexane isomerization system employing the same general type of catalyst but operating under substantial hydrogen pressure. The isobutane produced by simultaneously isomerizing pentanes and butanes (or produced by the disproportionation of pentane in the absence of added aromatics) may be charged to an alkylation plant for treatment with olefins to produce aviation gasoline and other valuable hydrocarbons.

While I have described in considerable detail a specific example of my invention it should be understood that the invention is not limited thereto since innumerable modifications and alternative operating conditions will be apparent to those skilled in the art from the above description.

I claim:

1. The method of isomerizing normal paraffin hydrocarbons of more than 3 but less than 6 carbon atoms by means of a Friedel-Crafts catalyst which method comprises isomerizing said hydrocarbons by contacting them with said catalyst under isomerization conditions in the presence of an amount of an aromatic hydrocarbon within the approximate range of 0.02 to 3% by volume based on hydrocarbon charge.

2. The method of isomerizing normal paraffin hydrocarbons of more than 3 but less than 6 carbon atoms by means of a Friedel-Crafts catalyst which method comprises isomerizing said hydrocarbons by contacting them with said catalyst under isomerizing conditions in the presence of an amount of an aromatic hydrocarbon within the approximate range of .1 to 1% by volume based on paraffin hydrocarbon charging stock.

3. The method of isomerizing normal paraffin hydrocarbons of more than 3 but less than 6 carbon atoms by means of an aluminum halide catalyst promoted by a hydrogen halide activator, which method comprises isomerizing said hydrocarbons by contacting them with said catalyst under isomerization conditions in the presence of an amount of an aromatic hydrocarbon within the approximate range of 0.02 to 3% by volume based on paraffin hydrocarbon charging stock.

4. The method of isomerizing normal pentane which method comprises adding to said pentane an amount of an aromatic hydrocarbon within the approximate range of 0.02 to 3% by volume based on said pentane, contacting said pentane in the presence of said additive with an aluminum halide-hydrocarbon complex promoted by a hydrogen halide activator under isomerization conditions and separating catalyst and activator from product after said contacting step.

5. The method of isomerizing pentanes for the production of isopentane while inhibiting cracking and disproportionation which method comprises fractionating a light hydrocarbon mixture to remove therefrom hydrocarbons higher boiling than pentane and to produce a charging stock consisting chiefly of normal pentane and containing less than 20% of higher boiling hydrocarbons, adding to said charging stock an amount of aromatic hydrocarbons within the approximate range of about 0.02 to 3% by volume based on charging stock, contacting said charging stock in the presence of said additive and in the presence of a hydrogen halide activator an amount within the approximate range of 2 to 20% by weight based on charging stock with an aluminum halide paraffinic-hydrocarbon complex in an isomerization zone at a temperature within the approximate range of 100 to 350° F. under a pressure sufficient to maintain liquid phase conversion conditions and at a space velocity within the approximate range of .3 to 3 volumes of charging stock per volume of complex per hour, cooling the conversion products and reducing the pressure thereon to facilitate venting of gases while retaining the bulk of the activator in product solution, stripping activator from the product and returning said stripped activator to the isomerization zone, neutralizing the stripped product and fractionating the neutralized product to obtain an isopentane fraction.

6. The method of claim 5 wherein the conversion zone is maintained at a temperature in the general vicinity of about 200° F. and the amount of aromatic hydrocarbons is in the general vicinity of about 0.5% by volume based on charging stock.

7. The method of simultaneously isomerizing a mixture of normal pentane and normal butane which method comprises adding a small amount of aromatic hydrocarbon within the approximate range of 0.02 to 3% by volume to a butane-pentane mixture containing less than 20% of heavier hydrocarbons, contacting said charging stock in the presence of said additive with an aluminum chloride paraffinic hydrocarbon complex in the presence of about 2 to 20% by weight of hydrogen chloride based on charging stock in an isomerization zone at a temperature within the approximate range of 100 to 350° F., and under sufficient pressure to maintain liquid phase conversion conditions, maintaining a column of catalyst in said zone at least about 5 feet in depth and employing a space velocity within the approximate range of .3 to 3 volumes of liquid charging stock per hour per volume of complex in the reaction zone, separating catalyst material and activator from reaction products and fractionating said reaction products to separate an isopentane fraction from a higher boiling fraction.

8. The method of producing isopentane which method comprises fractionating a light hydrocarbon in a fractionation zone to obtain a butane fraction, an isopentane fraction, a normal pentane fraction and a fraction heavier than normal pentane, adding about 0.02 to 3% by volume of an aromatic hydrocarbon to the normal pentane fraction, contacting said normal pentane fraction together with said additive with an aluminum halide isomerization catalyst under isomerization conditions in the absence of added hydrogen, separating catalyst material from isomerization products and introducing said isomerization products into said fractionation zone.

9. The method of producing isopentane which comprises fractionating a pentane charging stock for removing a butane fraction, an isopentane fraction, a normal pentane fraction and heavier fraction, adding about .05 to 3% by volume of an aromatic hydrocarbon to said normal pentane fraction, contacting said normal pentane fraction together with the added aromatic with a column of aluminum halide paraffinic hydrocarbon complex in the presence of a hydrogen halide activator at a temperature within the range of 100 to 350° F. and at a pressure sufficient to maintain liquid phase conversion conditions, stripping the hydrogen halide activator from the products, returning the hydrogen halide activator together with make-up hydrogen halide activator to the conversion zone, neutralizing the stripped products and returning said neutralized products to said fractionation zone.

10. The method of isomerizing normal pentane which method comprises contacting said normal pentane with an aluminum chloride-hydrocarbon complex promoted by hydrogen chloride under isomerization conditions in the presence of an amount of an aromatic hydrocarbon within the approximate range of .02 to 3% by volume based on said normal pentane charge and in the absence of any substantial amount of added hydrogen or paraffinic hydrocarbons heavier than pentane, removing from the isomerization zone complex which has become relatively spent, regenerating at least a part of the removed catalyst by treating it with hydrogen in the presence of hydrogen chloride at a temperature within the approximate range of 200 to 450° F. and a pressure within the approximate range of 500 to 1500 pounds per square inch and recycling the regenerated catalyst to the isomerization zone.

11. The method of isomerizing a hydrocarbon fraction consisting of normal pentane which method comprises contacting said normal pentane with aluminum chloride promoted by hydrogen chloride under isomerization conditions in the presence of 0.1 to 0.7% by volume of benzene based on said normal pentane charge.

12. The method of isomerizing normal pentane which method comprises adding to said pentane an amount of an aromatic hydrocarbon within the range of about .1 to 3% by volume based on said pentane, contacting said pentane in the presence of said additive with an aluminum halide-paraffinic hydrocarbon complex promoted by a hydrogen halide activator under isomerization conditions and fractionating the product after said contacting step.

13. The method of isomerizing a hydrocarbon fraction consisting essentially of normal pentane which method comprises contacting said fraction with an aluminum chloride isomerization catalyst promoted by hydrogen chloride under isomerization conditions in the presence of an amount of aromatic hydrocarbon within the range of about .1 to 3% by volume of aromatic hydrocarbon based on said hydrocarbon fraction.

14. The method of isomerizing a hydrocarbon fraction consisting essentially of normal pentane which method comprises contacting said fraction with an aluminum chloride isomerization catalyst promoted by hydrogen chloride under isomerization conditions in the presence of an amount of benzene within the range of about .1 to 3% by volume of benzene based on said hydrocarbon fraction.

15. In a process for isomerizing normal pentane to iso-pentane wherein said normal pentane is contacted with a halide isomerization catalyst comprising a hydrogen halide under isomerization conditions and wherein the contacting of said normal pentane with said catalyst under said conditions normally results in substantial pentane degradation due to cracking, the improvement which comprises effecting said contacting in the presence of an amount of added aromatic hydrocarbon sufficient to substantially inhibit said cracking but insufficient to materially impair the isomerization activity of the catalyst.

16. The method of isomerizing normal pentane which method comprises contacting said normal pentane with an aluminum chloride isomerization catalyst promoted by hydrogen chloride under such isomerization conditions that substantial cracking of the pentane would normally result, and effecting said contacting in the presence of an amount of added benzene sufficient to substantially inhibit said cracking but insufficient to materially impair the isomerization activity of the catalyst.

17. The method of isomerizing normal paraffin hydrocarbon to paraffin hydrocarbon of increased branched chain structure in a low boiling saturated hydrocarbon fraction containing a substantial proportion of normal pentane and which is free from naturally occurring aromatic hydrocarbons, which comprises adding to said hydrocarbon fraction an amount of an aromatic hydrocarbon within the approximate range of 0.1 to 3% by volume on the basis of the hydrocarbons charged, and contacting said hydrocarbon fraction containing said additive with an aluminum halide catalyst and a hydrogen halide promoter under isomerization conditions such that said hydrocarbons normally would undergo substantial cracking in the absence of said additive, the proportion of added aromatic hydrocarbon being such that cracking is substantially inhibited while substantial normal paraffin isomerization takes place as the principal reaction of the process.

18. The method of isomerizing normal pentane which comprises adding to said pentane an amount of a mononuclear aromatic hydrocarbon of the benzene series within the approximate range of 0.1 to 3% by volume based on the normal pentane charge, and contacting said normal pentane at a temperature of about 150 to 250° F. with an aluminum halide catalyst and a hydrogen halide promoter under isomerization conditions at which said normal pentane would normally undergo substantial cracking in the absence of said additive, the proportion of added aromatic hydrocarbon of the benzene series and the temperature of contacting being such that cracking is substantially inhibited while substantial isomerization of normal pentane to isopentane takes place as the principal reaction of the process.

19. A process for isomerizing normal pentane in a saturated hydrocarbon charging stock consisting essentially of normal pentane which process comprises contacting said charging stock with a halide isomerization catalyst comprising a hydrogen halide under isomerization conditions in the presence of an amount of an alkyl benzene which amount is within the range of .02 to 3% by volume based on said charging stock.

BERNARD H. SHOEMAKER.

REFERENCES CITED

The following references are of record in the file of this patent:

UNITED STATES PATENTS

| Number | Name | Date |
| --- | --- | --- |
| 2,266,012 | D'Ouville et al. | Dec. 16, 1941 |
| 2,288,866 | Hoog | July 7, 1942 |
| 2,293,891 | Evering et al. | Aug. 25, 1942 |
| 2,299,716 | Van Peski | Oct. 20, 1942 |
| 2,300,249 | Evering et al. | Oct. 27, 1942 |
| 2,306,253 | McMillan | Dec. 22, 1942 |

FOREIGN PATENTS

| Number | Country | Date |
| --- | --- | --- |
| 52,359 | Netherlands | Mar. 17, 1942 |